(12) United States Patent
Xie et al.

(10) Patent No.: US 8,872,925 B2
(45) Date of Patent: Oct. 28, 2014

(54) METHOD AND DEVICE FOR CAMERA CALIBRATION

(75) Inventors: Donghai Xie, Beijing (CN); Lei Wang, Beijing (CN)

(73) Assignee: Vimcro Corporation, Beijing (CN)

( * ) Notice: Subject to any disclaimer, the term of this patent is extended or adjusted under 35 U.S.C. 154(b) by 266 days.

(21) Appl. No.: 12/785,084

(22) Filed: May 21, 2010

(65) Prior Publication Data

US 2010/0295948 A1  Nov. 25, 2010

(30) Foreign Application Priority Data

May 21, 2009  (CN) .......................... 2009 1 0084165

(51) Int. Cl.
| | |
|---|---|
| H04N 5/225 | (2006.01) |
| G06T 7/00 | (2006.01) |
| H04N 17/00 | (2006.01) |
| H04N 17/02 | (2006.01) |
| H04N 9/47 | (2006.01) |
| H04N 7/18 | (2006.01) |

(52) U.S. Cl.
CPC ..... G06T 7/0018 (2013.01); *G06T 2207/10016* (2013.01)
USPC ........................ 348/207.99; 348/175; 348/135

(58) Field of Classification Search
CPC ....... H04N 7/181; H04N 5/235; H04N 5/247; G08B 13/19645; G08B 13/19693
USPC ................................ 348/175, 135, 139, 142
See application file for complete search history.

(56) References Cited

U.S. PATENT DOCUMENTS

| | | | |
|---|---|---|---|
| 2008/0166019 A1* | 7/2008 | Lee ............................... | 382/106 |
| 2009/0110267 A1* | 4/2009 | Zakhor et al. ................. | 382/154 |

* cited by examiner

*Primary Examiner* — Christopher K Peterson
(74) *Attorney, Agent, or Firm* — Duane Morris LLP (57) ABSTRACT

Techniques pertaining to methods and devices for calibrating camera parameters are disclosed. According to one aspect of the present invention, objects on an image are detected and features on the objects, such as the top of a person, are identified. Perspective parallel lines based on the object features are constructed and vanishing points from the converged perspective parallel lines are determined. A vanishing line is defined according to the vanishing points. The intrinsic parameters, such as focal length, and the extrinsic parameters, such as tilting and pan angles, of a camera are calibrated according to the vanishing points, the vanishing line and a reference object with known dimensions, or known camera angles, The calibrated camera parameters are used for accurate photogrammetric measurements and computer vision applications.

10 Claims, 5 Drawing Sheets

METHOD AND DEVICE FOR CAMERA CALIBRATION

BACKGROUND OF THE INVENTION

1. Field of the Invention

The present invention relates to a field of camera calibration, more particularly to methods and devices for camera calibration from a single perspective image.

2. Description of Related Art

Camera calibration has always been an essential component of photogrammetric measurement and computer vision. Accurate camera calibration is necessary for extracting precise and reliable three-dimensional (3D) geometric information from two-dimensional (2D) plane images captured by a camera. Each 3D point in the 3D space may correspond to one 2D point in the 2D plane image captured by the camera. The relationship between the 3D points in the 3D space and the 2D points in the 2D plane image is represented as a perspective projection model of the camera. The perspective projection model comprises a plurality of intrinsic and extrinsic parameters of the camera. The intrinsic parameters are optical parameters of the camera, such as a focal length f, principal points and lens distortion parameters, etc. The extrinsic parameters are the pose and the position parameters of the camera, such as the tilt angle, the pan angle, the yaw angle and the height of the camera, etc. In camera calibration, the intrinsic parameters and the extrinsic parameters are estimated to construct the perspective projection model.

One of the conventional camera calibrations from a single perspective image is implemented based on a prearranged 3D control scene containing a plurality of known 3D control points. The camera captures a plane image of the 3D control scene. Points in the plane image corresponding to the known 3D control points are determined. The known 3D control points and the corresponding points in the plane image are substituted into the perspective projection model to calculate the unknown parameters including the intrinsic parameters and the extrinsic parameters.

The camera calibration depending on the 3D control scene has higher calibration accuracy. When the applications require high accuracy and the parameters of the camera are not frequently changed, the 3D control scene method is a preferable choice. However, implementing the 3D control scene method is a complex and difficult manual arrangement, and it is not always available for every applications.

Camera self-calibration is developed to calibrate the camera automatically and not depending on known reference objects. However, the current technology in the camera self-calibration is not very reliable and has lower calibration accuracy.

Thus, there is a need for improved techniques for accurate camera calibration from a single perspective image to overcome the above disadvantages.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to methods and devices for calibrating camera parameters. According to one aspect of the present invention, objects on an image are detected and features on the objects, such as the top of a person, are identified. Perspective parallel lines based on the object features are constructed and vanishing points from the converged perspective parallel lines are determined. A vanishing line is defined according to the vanishing points. The intrinsic parameters, such as focal length, and the extrinsic parameters, such as tilting and pan angles, of a camera are calibrated according to the vanishing points, the vanishing line and a reference object with known dimensions, or known camera angles, The calibrated camera parameters are used for accurate photogrammetric measurements and computer vision applications.

The present invention may be implemented in many forms including a method, a system, an apparatus or a part of a system. According to one embodiment, the present invention is a method for camera calibration, the method comprises: detecting objects in a video sequence; obtaining feature information from the detected objects; extracting at least two groups of perspective horizontal parallel lines according to the obtained feature information; estimating at least two horizontal vanishing points according to the at least two groups of perspective horizontal parallel lines; defining a horizontal vanishing line by the at least two horizontal vanishing points; and calculating calibration parameters of a camera according to the vanishing points and/or the vanishing line.

According to another embodiment, the present invention is a device for camera calibration, the comprises: an object detecting module configured for detecting objects from a video sequence captured by a camera; a feature-obtaining module configured for obtaining feature information of the detected objects; a parallel line extracting module configured for extracting at least two groups of perspective horizontal parallel lines according to the feature information of the detected objects; a vanishing point and vanishing line estimating module configured for estimating at lest two vanishing points according to the groups of perspective horizontal parallel lines, and defining a vanishing line by the two vanishing points; and a parameters calculating module configured for calculating calibration parameters of the camera according to the vanishing points and/or the vanishing line.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Embodiments of the present invention are discussed herein with reference to FIGS. 1-11. However, those skilled in the art will readily appreciate that the detailed description given herein with respect to these figures is for explanatory purposes only as the invention extends beyond these limited embodiments.

In theory, a group of perspective parallel lines in an image captured by a camera may be shown to converge to a common point called a vanishing point. Two groups of perspective parallel lines converge in different directions may form two independent vanishing points which define a vanishing line. A vanishing line parallel to the ground plane is called a horizon line, or a horizontal vanishing line. The calibrations parameters of the camera can be calculated by using the vanishing points and the vanishing line extracted from the image captured by the camera.

Hence, perspective parallel lines in the image are very important geometric information in calculating calibration parameters of the camera. Accurate and sensible extraction of the perspective parallel lines from the image is one of the major factors affecting the accuracy of the calibration parameters.

Figure 1:
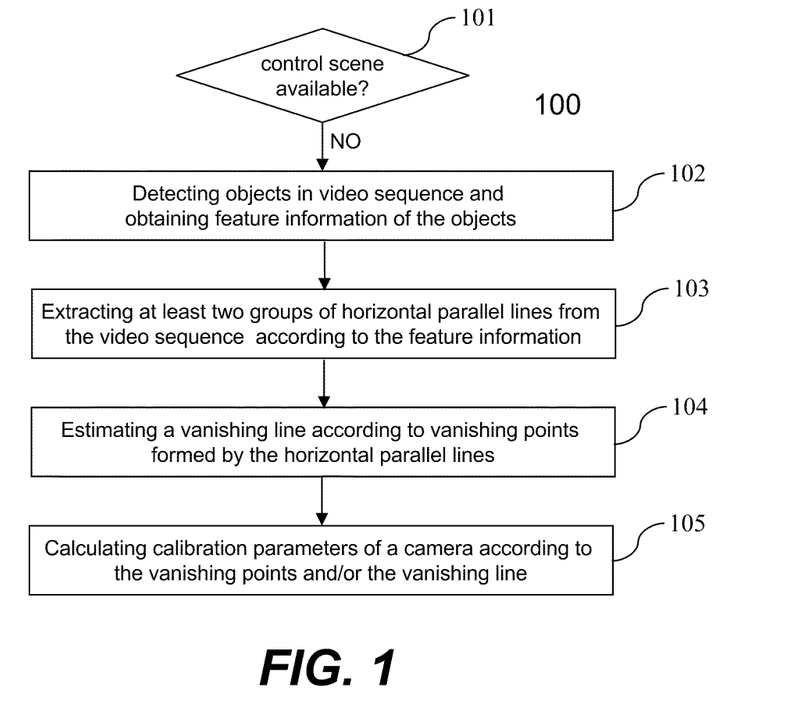
FIG. 1 is a flow chart showing a method for camera calibration according to a first embodiment of the present invention.

FIG. 1 is a flowchart or process 100 of showing camera calibration according to a first embodiment of the present invention. The process 100 may be implemented in a processor in a camera. At 101, the process 100 checks whether a prearranged control scene is available for camera calibration. If no, the process 100 is taken to the operation at 102. If yes, a conventional camera calibration method based on the control scene is used to estimate the calibration parameters of the camera. In one embodiment, a control scene is an actual 3D control scene, and a classic numerical analysis algorithm may be provided to calculate the calibrate parameters. In another embodiment, a 2D control scene is prearranged in a plane for camera calibration when the objects of interest are located on the ground such as in the video surveillance application It requires only four control points in the 2D control scene to calculate the homography matrix between the ground plane in the image and the ground plane in the real space. A homography matrix is an invertible transformation from the real projective plane to the projective plane that maps straight lines to straight lines. All calibration parameters can be estimated according to the homography matrix.

At 102, objects in the image are detected from a video sequence captured by the camera and the feature information of the detected objects is obtained. The objects in the video sequence may be moving and/or stationary. The feature information may include moving tracks, tops, bottoms and/or straight edges of the objects.

At 103, at least two groups of perspective horizontal parallel lines are extracted from the video sequence according to the feature information of the detected objects. Depending on implementation, at least one group of perspective vertical parallel lines is also extracted from the video sequence.

Objects of interests in the video surveillance images are usually located on the ground plane. All objects located on the ground plane form a plurality of groups of perspective horizontal or vertical parallel lines. For example, tracks of straight-moving vehicles along a highway may be used as a group of perspective horizontal parallel lines. For another example, straight lines Connecting tops and straight lines connecting bottoms of a person at different positions in an image may also be used to construct a group of perspective horizontal parallel lines. According to one aspect of the present invention, the perspective horizontal parallel lines can be extracted accurately and automatically by analyzing the video sequence, and are not restricted by the surveillance scenes.

At 104, at least two vanishing points are estimated according to the groups of perspective horizontal parallel lines, and a vanishing line is defined by two vanishing points. Each group of perspective horizontal parallel lines forms one horizontal vanishing point and two horizontal vanishing points define a horizontal vanishing line. Similarly, each group of perspective vertical parallel lines forms one vertical horizontal point. Any vertical structure or object such as pole, trunk or human body can be used to create a group of vertical parallel lines. At 105, calibration parameters of the camera are calculated according to the vanishing points and/or the vanishing line.

Because the parallel lines may be extracted from different video sequences at different surveillance positions, the vanishing points and the vanishing lines estimated according to the perspective parallel lines may be in different configurations. For example, three vanishing points created from three groups of orthogonal perspective parallel lines (orthogonal vanishing points) can be estimated; or, a horizontal vanishing line and a vertical vanishing point can be estimated; or only the horizontal vanishing line can be estimated. Thus, the calibration parameters of the camera may be calculated differently according to different configuration of the image.

The calibration parameters of the camera comprise the intrinsic parameters, such as focal length (f) and principal point ($u_0$, $v_0$), and the extrinsic parameters, such as tilt angle (β), pan angle (α), yaw angle (γ) and height ($H_C$) of the camera. All or part of the camera parameters required to be calculated in the camera calibration.

Figure 2:
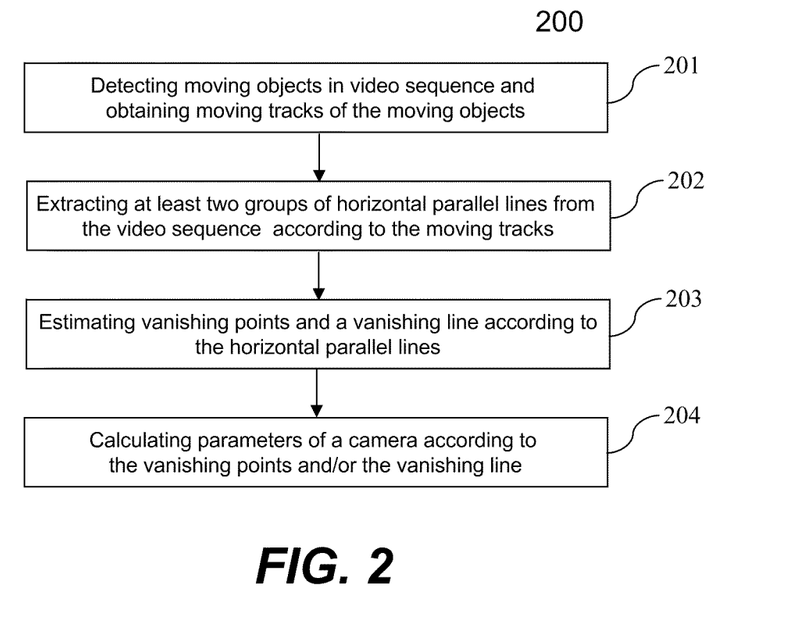
FIG. 2 is a flow chart showing a method for camera calibration according to a second embodiment of the present invention.

FIG. 2 is a flowchart or process 200 for camera calibration according to a second embodiment of the present invention. The process 200 may be implemented in a processor in a camera. At 201, moving objects are detected from video sequence captured by the camera and moving tracks of the moving objects are obtained. In one embodiment, the operation for detecting moving objects from video sequence comprises: establishing a background image of the video sequence which contains stationary objects of a scene; subtracting the background image from a current image which may contain moving objects; binarizing the difference image between the background image and the current image; analyzing connected components of the binarization image to obtain position and shape information of each moving object.

The moving tracks of the moving objects can be obtained by tracking the moving objects in the video sequence. Any conventional methods for tracking the moving objects can be used to obtain the moving tracks of the moving objects in the present invention.

At 202, at least two groups of perspective horizontal parallel lines are extracted from the video sequence according to the moving tracks of the moving objects.

In one embodiment, the operation for extracting parallel lines from the video sequence comprises: extracting the moving tracks after linear fitting as the perspective horizontal parallel lines when the moving tracks are close to straight lines.

For example, in a highway video surveillance scene, the vehicles may move straight along the highway. The moving tracks of the vehicles may be recorded. The moving track of each vehicle can be fitted into a straight line. A group of perspective horizontal parallel lines can be extracted by the linear-fitted moving tracks of vehicles.

In a preferred embodiment, at least one group of perspective vertical parallel lines is extracted from the video sequence if possible. At 203, at lest two vanishing points are estimated according to the groups of perspective horizontal parallel lines, and a horizontal vanishing line is defined by the two vanishing points. At 204, calibration parameters of the camera are calculated according to the vanishing points and/or the vanishing line.

Figure 3:
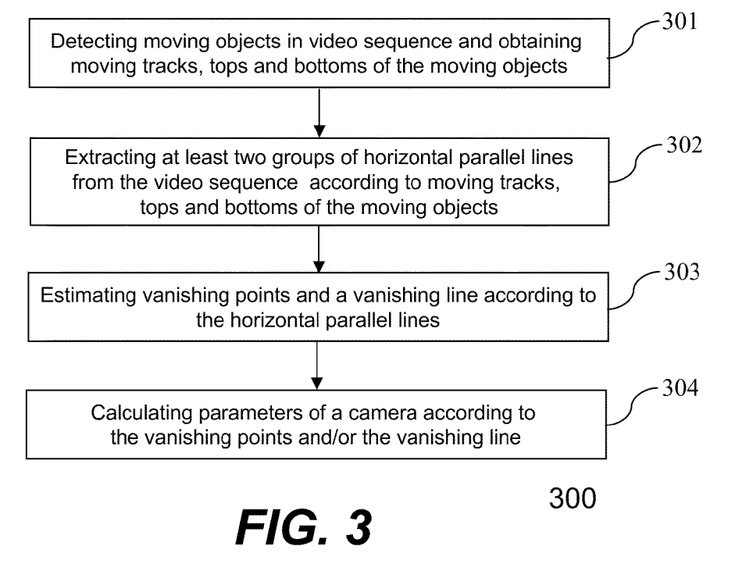
FIG. 3 is a flow chart showing a method for camera calibration according to a third embodiment of the present invention.

FIG. 3 is a flowchart or process 300 showing camera calibration according to a third embodiment of the present invention. The process 300 may be implemented in a processor in a camera. At 301, moving objects are detected from video sequence captured by the camera and moving tracks, tops and bottoms of the moving objects are obtained. The operation for detecting moving objects from video sequence and obtaining the moving tracks of the moving objects in the third embodiment may be identical with that in the second embodiment.

Any methods for detecting objects intellectually can be used to obtain the tops and the bottoms of the moving objects in the present invention. For example, the moving objects are walking humans. The operation for detecting humans comprises: calculating edge strength and discrete edge direction of the image; calculating an edge strength histogram according to the edge strength and the discrete edge direction; and verifying the edge strength histogram according to a hierarchical adaptive enhancement algorithm classifier to obtain the position of the human. For another example, the moving objects are vehicles, the operation for detecting vehicles comprises: extracting scale invariant feature transform (SIFT) features from the video sequence; ordering the SIFT features; and detecting the vehicles according to the ordered SIFT features by a trained classifier.

After the moving objects are detected by such object detecting algorithms, the tops and the bottoms of the moving objects can be further obtained by principal component analyzing (PCA) the moving objects.

At 302, at least two groups of horizontal parallel lines are extracted from the video sequence according to moving tracks, tops and bottoms of the moving objects.

In a preferred embodiment, straight lines connecting tops and straight lines connecting bottoms of one moving object at different positions are used as one or more groups of perspective horizontal parallel lines if the moving tracks of the moving objects are not straight lines.

At 303, at lest two vanishing points are estimated according to the groups of perspective horizontal parallel lines and a vanishing line is defined by the two vanishing points. At 304, calibration parameters of the camera are calculated according to the vanishing points and/or the vanishing line.

Figure 4:
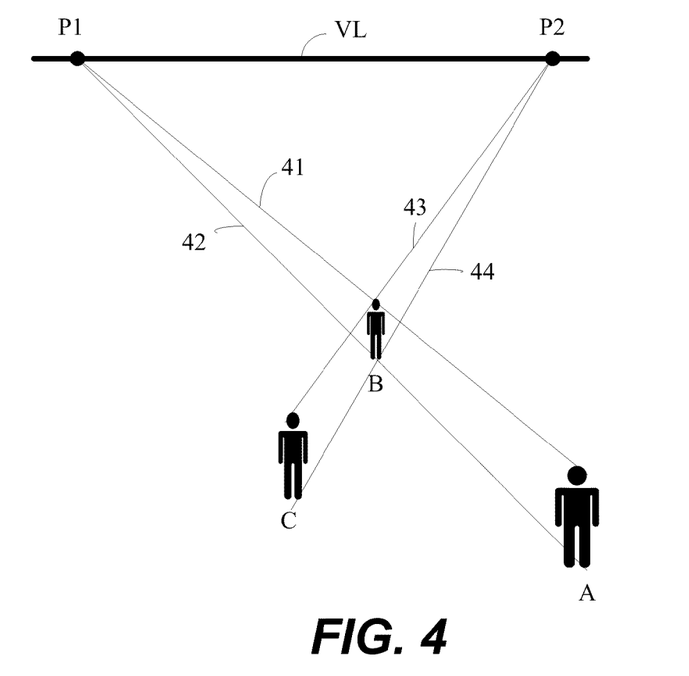
FIG. 4 is a schematic diagram showing two groups of perspective parallel lines, vanishing points and a vanishing line.

FIG. 4 schematically shows two groups of perspective parallel lines, vanishing points and a vanishing line. FIG. 4 shows one human at three different locations A, B and C. A straight line 41 connects the top of the human at position A and at position B. A straight line 42 connects the bottom of the human at position A and at position B. A straight line 43 connects a top of the human at position C and at position B. A straight line 44 connects a bottom of the human at position C and at position B. The straight lines 41 and 42 are a group of perspective horizontal parallel lines, and the straight lines 43 and 44 are another group of perspective horizontal parallel lines. The perspective horizontal parallel lines 41 and 42 forms a horizontal vanishing point P1. The horizontal parallel lines 43 and 44 forms a horizontal vanishing point P2. The horizontal vanishing points P1 and P2 defines a horizontal vanishing line VL.

Figure 5:
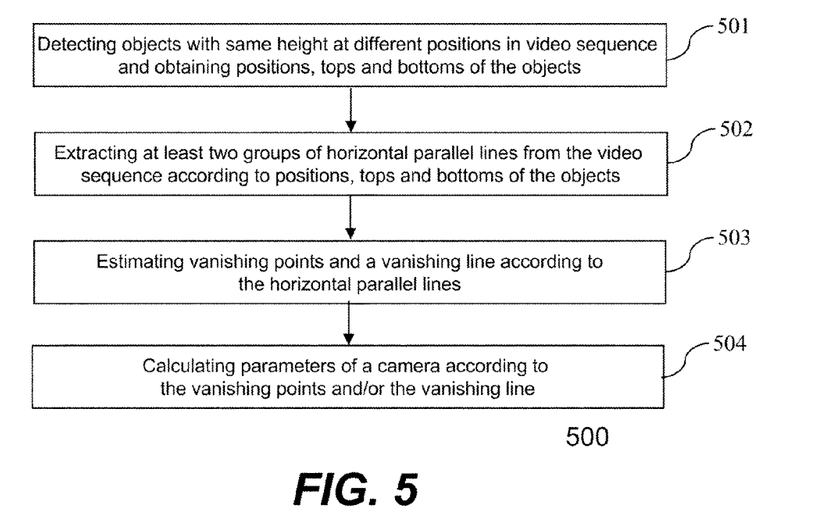
FIG. 5 is a flow chart showing a method for camera calibration according to a fourth embodiment of the present invention.

FIG. 5 is a flowchart or process 500 showing camera calibration according to a fourth embodiment of the present invention. The process 500 may be implemented in a processor in a camera. At 501, objects with same height are detected from a video sequence. The positions, tops and bottoms of the moving objects are obtained. The objects with same height may be moving objects or stationary. E.g., the moving objects may be vehicles or walking human beings, and the stationary objects may be telegraph poles or footsteps.

At 502, at least two groups of perspective horizontal parallel lines are extracted from the video sequence according to the positions, the tops and the bottoms of the objects. A straight line connecting the tops and a straight line connecting the bottoms of two objects at different positions forms a group of perspective horizontal parallel lines because the two objects are at height. Thus, a plurality of perspective horizontal parallel lines can be obtained according to a plurality of objects at different positions.

At 503, at least two vanishing points are estimated according to the perspective horizontal parallel lines and a vanishing line is defined by the two vanishing points. At 504, calibration parameters of the camera are calculated according to the vanishing points and/or the vanishing line.

Figure 6:
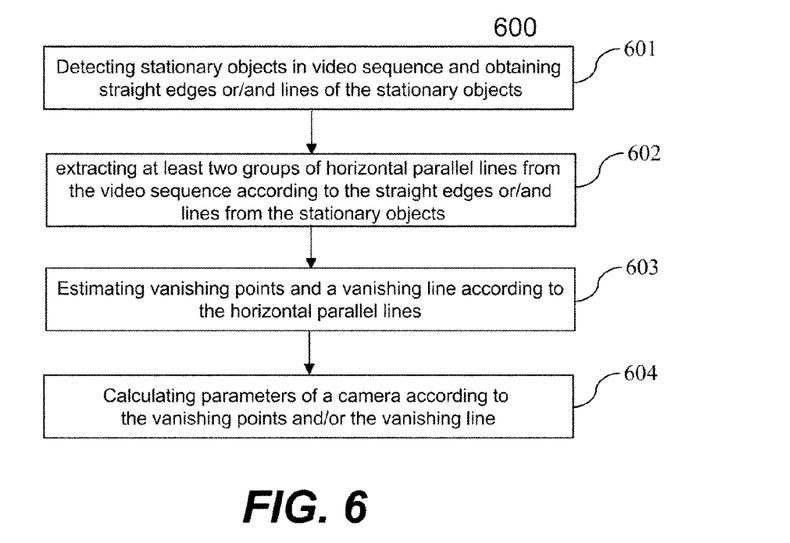
FIG. 6 is a flow chart showing a method for camera calibration according to a fifth embodiment of the present invention.

FIG. 6 is a flowchart or process 600 showing a method for camera calibration according to a fourth embodiment of the present invention. The process 600 may be implemented in a processor in a camera. At 601, stationary objects are detected from video sequence and straight edges or/and lines of the stationary objects are obtained. At 602, at least two groups of perspective horizontal parallel lines are extracted from the video sequence according to the straight edges or/and lines from the stationary objects In one embodiment, a canny edge detection operator is used to extract edges of the stationary objects from the image.

If the image has rich edges, a Hough transform is used to extract all straight line segments from the image; otherwise, a Live-ware algorithm is used to extract straight edges and fit the straight edges into straight lines. Then, the horizontal straight lines parallel to each other are selected as a group of the perspective horizontal parallel lines, and the vertical straight lines parallel to each other are selected as a group of the perspective vertical parallel lines.

At 603, at least two vanishing points are estimated according to the perspective horizontal parallel lines and a vanishing line is defined by the two vanishing points. At 604, calibration parameters of the camera are calculated according to the vanishing points and/or the vanishing line.

Generally, the more the estimated vanishing points are, the higher the accuracy of the calculated calibration parameters is. Hence, in practice, the above mentioned embodiments from the second to the fifth can be combined for higher calculation accuracy.

In the present invention, the calculation of the calibration parameters includes four different cases. In the first case, the horizontal vanishing line and one of the two horizontal vanishing points are estimated and a real height of a reference object is known. The real height of the reference object is used as a calibration standard. The procedures to calibrate the calibration parameters comprise: tilting the camera to at least one tilt angle within a preset angle range; calculating calibrations parameters of the camera and a visual height of the reference object according to the tilt angle, the horizontal vanishing line, the horizontal vanishing point and a known real height of the reference object; and calculating a difference between the visual height and the known real height of the reference object for each tilt angle; and using the calibration parameters calculated from the tilt angle, in which the difference between the visual and real heights the smallest as the final calibrated parameters.

Depending on implementation, the calculation of the calibration parameters comprises following operations. The tilt angle $\beta$ is traversed between 0 and 90 degrees. The focal length f and a vertical vanishing point are calculated according to the traversed tilt angle $\beta 0$ and the estimated horizontal vanishing point.

Figure 7:
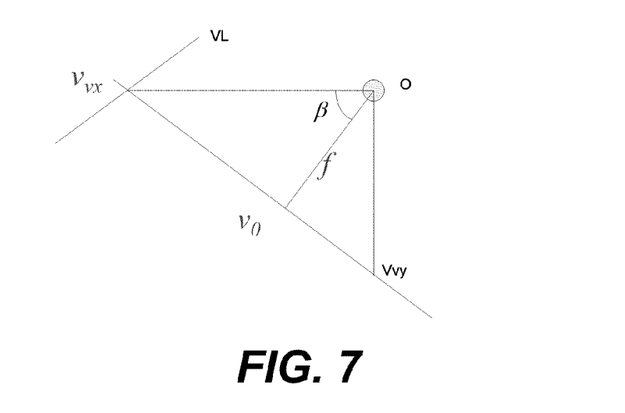
FIG. 7 is a schematic diagram showing geometric relationship among a tilt angle β, a vertical vanishing point $V_{PY}$ and a vanishing line $V_L$.

Referring to FIG. 7, which shows a relationship of the tilt angle $\beta$, the vertical vanishing point $V_{VY}$ and the vanishing line $V_L$, we have:

$$\tan\beta = \frac{v_0 - v_{vx}}{f}$$

$$\tan\beta = \frac{f}{v_{vy} - v_0}$$

where O is the principal point, $v_0$ is the ordinate of the principal point, $v_{vx}$ is the ordinate of the intersection of the vanishing line and the vanishing points in the x direction. The above equations are set up after the horizontal vanishing line is rotated.

When the horizontal vanishing line is known, the focal length f can be calculated according to the tilt angle $\beta$, and then the vertical vanishing points can be calculated according to the focal length f and the tilt angle $\beta$.

Figure 8:
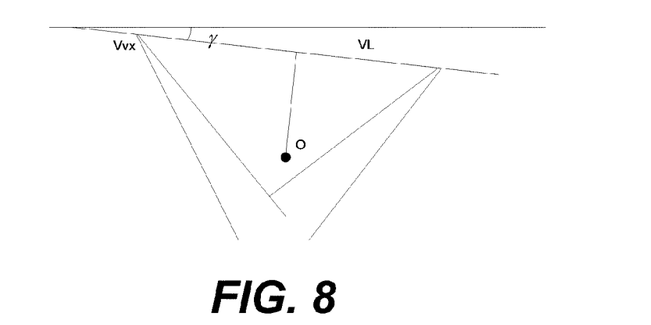
FIG. 8 is a schematic diagram showing geometric relationship amongst a yaw angle γ, a principal point o and a vanishing line $V_L$.

FIG. 8 shows a relationship between the yaw angle $\gamma$, the principal point O and the vanishing line $V_L$. The angle between the horizontal axis of the image and the horizontal vanishing line is the yaw angle $\gamma$.

The pan angle $\alpha$ is calculated according to one of the two vanishing points of the horizontal vanishing line by:

$$\alpha = c\tan^{-1}((uv_x - u_0)\cos(\beta)/f)$$

The height $H_C$ of the camera is calculated according to the estimated horizontal vanishing line, the vertical vanishing point and the known real height of the reference object by:

$$\frac{H}{H_c} = 1 - \frac{d(x', c)d(x, v)}{d(x, c)d(x', v)}$$

The Homography Matrix between the ground points and the pixel points is determined according to the focal length, f, the three angles $\beta$, $\gamma$, $\alpha$ and the height, $H_C$, of the camera.

Provided that the ground plane is located on the plane of $Z=0$, a 3*3 matrix representing the relationship between the ground points and the pixel points is:

$$\begin{bmatrix} u \\ v \\ 1 \end{bmatrix} = \lambda A [R \ T] \begin{bmatrix} X \\ Y \\ 0 \\ 1 \end{bmatrix} = \lambda A [r_1 \ r_2 \ T] \begin{bmatrix} X \\ Y \\ 1 \end{bmatrix}$$

$$H = A[r_1 \ r_2 \ T],$$

H is the Homography Matrix.

A visual height of the reference object is calculated according to the Homography Matrix and the real height of the reference object. A difference between the visual height and the real height of the reference object is calculated. The calibration parameters calculated based on the tilt angle $\beta$ corresponding to the smallest difference is used as the final calibration result.

In the second case, the horizontal vanishing line is estimated and a real height of a reference object is known. The real height of the reference object is used as a calibration parameter. The calculation of the calibration parameters for this case is described hereafter in detail.

The span angle $\alpha$ is calculated according to the real height of the reference object, the horizontal vanishing line. A visual height of the reference object detected from the image is calculated by:

$$\alpha Z = \frac{-\|b \times t\|}{(\hat{l} \cdot b)\|v \times t\|}$$

where Z is the real height of the reference object, t is the coordinate of the top of the reference object, b is the coordinate of the bottom of the reference object, v is a directional vector of the vertical vanishing point.

Figure 9:
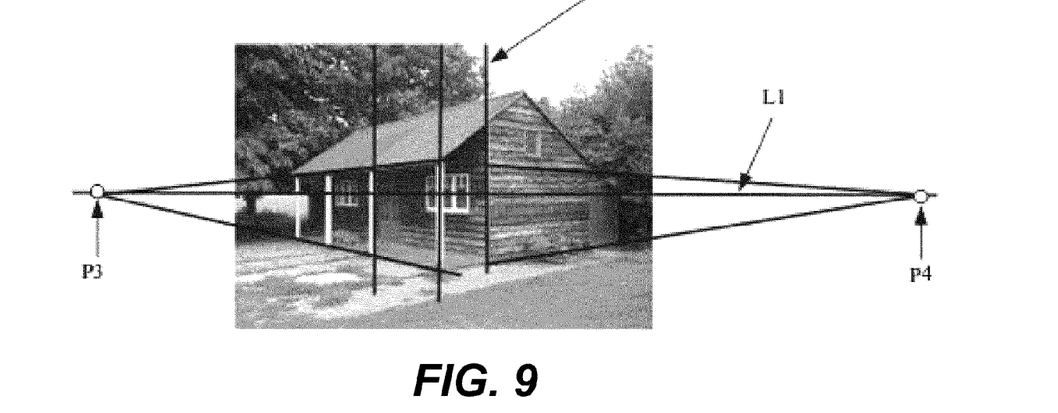
FIG. 9 is a schematic diagram showing vanishing points and a vanishing line.
Figure 10:
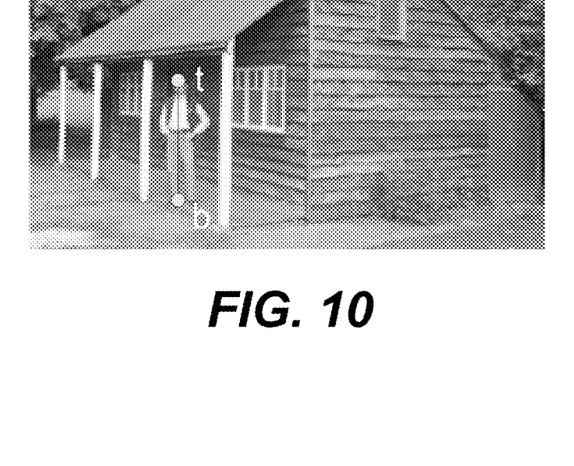
FIG. 10 is a schematic diagram showing a reference object.

Referring to FIG. 9, a group of parallel lines forms a vanishing point P3, another group of parallel lines forms a vanishing point P4. The vanishing points P3 and P4 define a vanishing line L1. A group of vertical parallel lines 93 may form a vertical vanishing point at infinity. Referring to FIG. 10, a person is used as the reference object. t is the coordinate of the top of the reference object, b is the coordinate of the bottom of the reference object.

Once the span angle $\alpha$ is calculated, the real height of any object in the image can be calculated according to the coordinates b and t of the reference object.

In the third case, the horizontal vanishing line is estimated and a real length or a real angle of a reference object is known. The real length or the real angle of the reference object is used as a calibration parameter. The calculation of the calibration parameters for this case is described hereafter in detail.

A projection relationship between the points in the ground plane and the points in the image is represented as:

$$X = SAPx$$

where X is the coordinate in the Euclid space, x is the coordinate in the image, P is a projection matrix, A is an affine matrix and S is a similarity transformation matrix. The three matrices are:

$$A = \begin{pmatrix} \frac{1}{\beta} & -\frac{\alpha}{\beta} & 0 \\ 0 & 1 & 0 \\ 0 & 0 & 1 \end{pmatrix} \quad P = \begin{pmatrix} 1 & 0 & 0 \\ 0 & 1 & 0 \\ l_1 & l_2 & l_3 \end{pmatrix} \quad S = \begin{pmatrix} sr_1 & sr_2 & t_x \\ sr_3 & sr_4 & t_y \\ 0 & 0 & 1 \end{pmatrix} = \begin{pmatrix} sR & \bar{t} \\ \bar{0}^T & 1 \end{pmatrix}.$$

The P matrix may be recovered according to the vanishing line because the elements ($l_1$, $l_2$, $l_3$) in the P matrix is the coordinates of the vanishing line. The A matrix may be recovered according to the real size or the real angle of the reference object on the ground plane. The S matrix comprises rotation, translation and scale factors. The rotation and the translation do not affect the length or height of the object. The scale factor may be recovered according to the real length or the real angle of the reference object.

After the camera calibration, the real length or height of any object on the image can be calculated according to the recovered projection relationship. In the fourth case, three orthogonal vanishing points are estimated and the real height of a reference object is known. The real height of the reference object is used as a calibration parameter.

The calculation of the calibration parameters comprises: calculating the yaw angle γ according to an angle between the horizontal vanishing line and the horizontal axis of the image; calculating the focal length, f, according to the vertical vanishing point; calculating the tilt angle β according to the horizontal vanishing line and the focal length, f; calculating the principal point according to the three orthogonal vanishing points; calculating the pan angle α according to the principal point, the focal length, f, and one of the vanishing points of the horizontal vanishing line; and calculating the height $H_C$ of the camera according to the horizontal vanishing line and the known height of the reference object.

Figure 11:
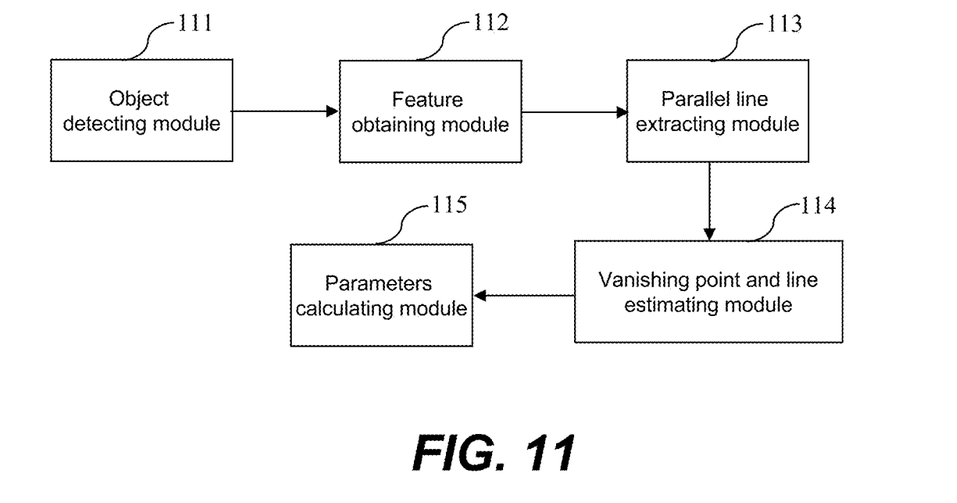
FIG. 11 is a block diagram showing a device for camera calibration according to one embodiment of the present invention.

FIG. 11 is a block diagram showing a device for camera calibration according to one embodiment of the present invention. Referring to FIG. 11, the device comprises an object detecting module 111, a feature obtaining module 112, a parallel line extracting module 113, a vanishing point and line estimating module 114, and a parameter calculating module 115.

The object detecting module 111 is configured for detecting objects on an image from video sequence captured by a camera. The detected object is fed to the feature obtaining module 112, which is configured for obtaining feature information of the detected objects. The parallel line extracting module 113 is configured for extracting at least two groups of horizontal parallel lines according to the feature information obtained in 112.

The vanishing point and line estimating module 114 is configured for estimating at least two vanishing points according to the groups of horizontal parallel lines, and defining a vanishing line by the at least two vanishing points. The parameters calculating module 115 is configured for calculating calibration parameters of the camera according to the vanishing points and/or the vanishing line.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for camera calibration, the method comprising:
   detecting moving objects in a video sequence;
   obtaining tops and bottoms of the detected moving objects;
   creating straight lines connecting the tops and straight lines connecting the bottoms of the moving objects at different positions as perspective horizontal parallel lines;
   estimating at least two horizontal vanishing points according to the at least two groups of perspective horizontal parallel lines;
   defining a horizontal vanishing line by the at least two horizontal vanishing points; and
   calculating calibration parameters of a camera according to the vanishing points and/or the vanishing line.

2. The method according to claim 1, wherein feature information comprises moving tracks of the moving objects, and estimating at least two groups of perspective horizontal parallel lines according to the feature information comprises:
   utilizing the moving tracks of the moving objects as perspective horizontal parallel lines if the moving tracks are essentially straight.

3. The method according to claim 1, wherein the moving objects have same height and are located at different positions, feature information comprises tops and bottoms of the moving objects, and the estimating at least two groups of perspective horizontal parallel lines according to the feature information comprises:
   extracting straight lines by connecting the tops and straight lines connecting the bottoms of the objects at different positions as the perspective horizontal parallel lines.

4. The method according to claim 1, wherein the calculating calibration parameters of a camera according to the vanishing points and/or the vanishing line comprises:
   tilting the camera to at least one tilt angle within a preset angle range;
   calculating calibration parameters of the camera and a visual height of a reference object according to each of the at least one tilt angle, the horizontal vanishing line, the at least two horizontal vanishing points and a known real height of the reference object; and
   calculating a difference between the visual height and the known real height of the reference object for each tilt angle; and using the calibration parameters calculated from the tilt angle, in which the difference between the visual and real heights is the smallest, as final calibrated parameters.

5. The method according to claim 4, wherein the calibration parameters comprise a focal length, the tilt angle, a pan angle, a yaw angle, a height of the camera and a known real height of a reference object, and wherein the calculating calibrations parameters of the camera and a visual height of the reference object comprise:

calculating the focal length of the camera and a vertical vanishing point according to the tilt angle and the horizontal vanishing point;

calculating the yaw angle of the camera according to the horizontal vanishing line;

calculating the pan angle of the camera according to one vanishing point of the horizontal vanishing line;

calculating a height of the camera according to the horizontal vanishing line, the vertical vanishing point and a known real height of the reference object;

determining a matrix between ground points and image points according to the focal length, the yaw angle, the tilt angle, the pan angle and the height of the camera; and calculating the visual height of the reference object according to the matrix and the real height of the reference object.

6. The method according to claim 1, wherein the calibration parameters comprise a pan angle, and a known real height of a reference object, and wherein the calculating calibration parameters of a camera according to the vanishing points and/or the vanishing line comprises: calculating the pan angle according to the real height of the reference object, the horizontal vanishing line, and a visual height of the reference object.

7. The method according to claim 1, wherein the calibration parameters comprise a focal length, a principal point, a tilt angle, a pan angle, a yaw angle, a height of the camera and a known real height of a reference object, the at least two horizontal vanishing points comprises three orthogonal vanishing points, and the calculating calibration parameters of a camera according to the vanishing points and/or the vanishing line comprises:

calculating the yaw angle according to the horizontal vanishing line; calculating the focal length according to a vertical vanishing point;

calculating the tilt angle according to the horizontal vanishing line and the focal length;

calculating the principal point according to the three orthogonal vanishing points;

calculating the pan angle according to the principal point, the focal length and one of the at least two vanishing points of the horizontal vanishing line; and calculating the height of the camera according to the horizontal vanishing line and the known height of the reference object.

8. A device for camera calibration, the device comprising:

an object detecting module configured for detecting moving objects from a video sequence captured by a camera;

a feature-obtaining module configured for obtaining tops and bottoms of the detected moving objects;

a parallel line extracting module configured for creating straight lines connecting the tops and straight lines connecting the bottoms of the moving objects at different positions as perspective horizontal parallel lines;

a vanishing point and vanishing line estimating module configured for estimating at least two vanishing points according to groups of perspective horizontal parallel lines, and defining a vanishing line by the two vanishing points; and a parameters calculating module configured for calculating calibration parameters of the camera according to the vanishing points and/or the vanishing line.

9. The device according to claim 8, wherein feature information comprises moving tracks of the moving objects, and wherein a parallel line extracting module extracts the moving tracks of the moving objects as perspective horizontal parallel lines if the moving tracks are straight.

10. The device according to claim 8, wherein the moving objects have same height and are located at different positions, feature information comprises tops and bottoms of the moving objects.

* * * * *